United States Patent
Kato et al.

(10) Patent No.: US 6,371,608 B1
(45) Date of Patent: Apr. 16, 2002

(54) INK-JET PRINTING APPARATUS AND METHOD

(75) Inventors: Minako Kato, Yokohama; Jiro Moriyama, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/020,388

(22) Filed: Feb. 9, 1998

(30) Foreign Application Priority Data

Feb. 10, 1997 (JP) .............................................. 9-026534
Jan. 30, 1998 (JP) ........................................... 10-018937

(51) Int. Cl.[7] .................................................. R41J 2/17
(52) U.S. Cl. ...................................................... 347/96
(58) Field of Search ............................. 347/15, 41, 43, 347/101

(56) References Cited

U.S. PATENT DOCUMENTS 5,975,678 A * 11/1999 Kanemutsu et al. .......... 347/43

FOREIGN PATENT DOCUMENTS

| EP | 0526205 | 2/1993 |
|---|---|---|
| EP | 0703087 | 3/1996 |
| EP | 0726155 | 8/1996 |
| EP | 0726158 | 8/1996 |
| JP | 58128862 | 8/1983 |
| JP | 07195823 | 8/1995 |
| JP | 08052867 | 2/1996 |

* cited by examiner

*Primary Examiner*—John Barlow
*Assistant Examiner*—Michael S. Brooke
(74) *Attorney, Agent, or Firm*—Fitzpatrick, Cella, Harper & Scinto

(57) ABSTRACT

A printing duty for a single scanning operation is determined for each print head of color ink used for printing. When the printing duty D is judged to be larger than or equal to a predetermined threshold value Dth, dividing printing is executed in which the printing of a area for a single scanning operation is divided into two scanning operations. This operation can reduce the printing duty of the single scanning operation to reduce the dirt on an ejection portion for ejecting inks.

25 Claims, 11 Drawing Sheets

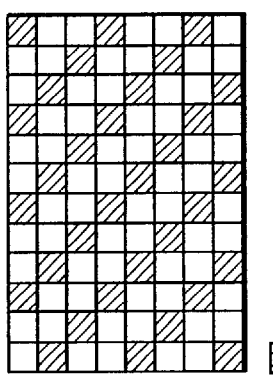
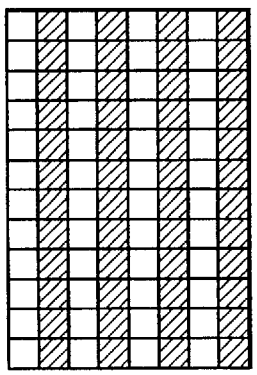 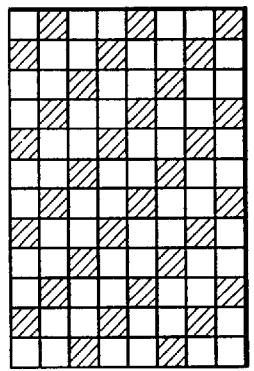 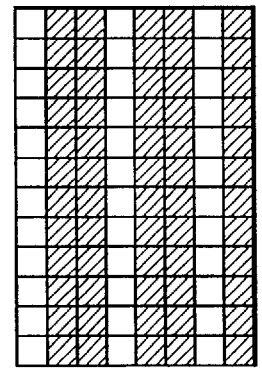
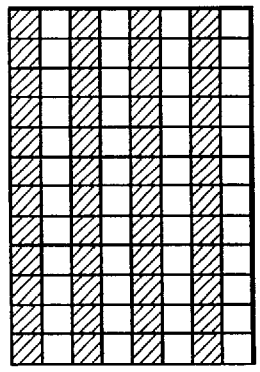 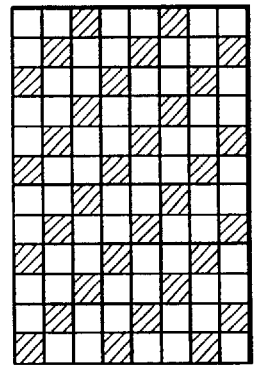 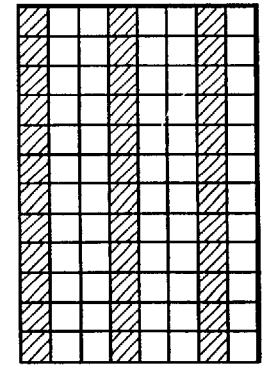
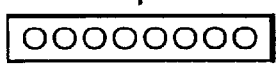 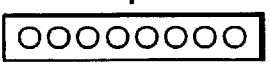 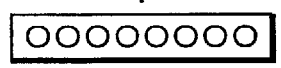
FIG.7A  FIG.7B  FIG.7C

INK-JET PRINTING APPARATUS AND METHOD

This application is based on patent application Nos. 026,534/1997 filed Feb. 10, 1997 and 018,937/1998 filed Jan. 30, 1998 in Japan, the content of which is incorporated hereinto by reference.

BACKGROUND OF THE INVENTION

1. Field of the Invention

The present invention relates to an ink-jet printing method and an apparatus, and particularly, to an ink-jet printing method and an apparatus in which an ink and a printing quality improving liquid that makes the ink insoluble or coagulate are ejected onto a printing medium. A definite device to which the present invention is applicable includes office equipment such as printers, copy machines and facsimile machines which use the ink-jet printing apparatus as an output device, industrial production machines and the like.

2. Description of the Prior Art

The ink-jet printing method is widely used for printers, copy machines the like because the method has various advantages such as its low noise, low running costs, and abilities to enable the apparatus to be compact and to easily realize the apparatus printing color images.

When, however, such a printing apparatus to which the ink jet printing method is applied performs printing of an image on a printing medium called plain paper, it may occur that a printing image has insufficient water-resistance. In addition, when printing color images, a high density image that does not cause feathering may be incompatible with an image having bleeding between colors. Thereby a durable image or a high-quality color image may not be achieved.

To improve the water-resistance of the image, an ink containing coloring materials having water-resistance has recently been put to practical use. The water-resistance of the ink, however, is still insufficient and the ink is unlikely to be dissolved into water after drying. As a result of this, an ejection opening and the like of a print head is likely to be clogged. In addition, to prevent this clogging, the apparatus must have a complicated configuration.

There has been disclosed a large number of techniques that improve image durability of a printed product by applying a processing liquid that reacts with a print ink to provide water-resistance, to the same position as an ink on a printing medium.

For example, Japanese Patent Application Laying-open No. 58-128862 discloses an ink-jet printing method in which a position to be printed in an image is preliminary identified and then the print ink and the processing liquid are applied in an overlaying manner to the identified position for printing. More specifically, the method allows following various printing manners. The processing liquid is applied to draw an image before the print ink is applied, the processing liquid is deposited on the image drawn the print ink or the processing liquid is further applied on the image which is drawn by depositing the processing liquid and then depositing the print ink. In addition, Japanese Patent Application Laying-open No. 8-7223 discloses a method which has a means for controlling whether the ejection of the processing liquid is performed or not, and whether or not the processing liquid is ejected in set depending on a user's selection or a medium used for printing. Furthermore, Japanese Patent Application Laying-open No. 7-195823 discloses a method for applying a colorless precursor that causes two- or three-component chemical reaction, to a surface of a printing medium so as to adjust its conditions of the surface. In this method, when the remaining amount of the colorless liquid becomes small, a conventional method for printing an image with a plurality of scanning operations is employed.

None of these publications, however, discloses a method for avoiding making an ink ejection portion dirty to increase reliability of the ink-jet printing apparatus. More specifically, when the processing liquid is used to improve the water-resistance of the inks as in the prior art, it is difficult to remove dirt on the ejection portion, as described below. Thus, this is a relatively important technical problem, but none of the above publications describe the method for avoiding making the ink ejection portion dirty.

On the other hand, this problem of making the ink ejection portion dirty has been known in conventional ink-jet printing methods that do not use the processing liquid as described above.

More specifically, when the print head ejects ink droplets onto the print medium to perform printing, the ink is deposited on an ink ejection opening surface of the print head due to the splashing of fine ink droplets (mist) or rebounding of ejected ink droplets from the printing medium. If a large amount of such droplets are gathered near the ejection opening or a foreign matter such as paper powder or the like are deposited to the ink droplets, there may be caused a harmful influence such that an ejection direction of the ink is varied (deflection), or the ink droplets can not be ejected (non ejection).

FIGS. 1A and 1B schematically show a process in which the ink ejection opening surface is made dirty due to the rebounding of the ink and the mist.

FIG. 1A shows the rebounding of the ink. In an example shown in the figure, a print head has respective ink ejection portions for ejecting liquids A and B, respectively, and eject the liquids with a relatively high printing duty.

As the print head moves, the liquid A is firstly ejected on a sheet, thereby spreading like an ocean. The liquid B is subsequently ejected on the ocean of the liquid A at a certain speed. As a result, there is caused a rebounding of the liquids A and B or their mixture and thereby, they are deposited on the respective ejection opening surfaces for the liquids A and B.

FIG. 1B shows a deposition process of mist. Droplets of the liquid A ejected from the ejection portion of liquid A are composed of a main ink droplet and fine ink droplets (mist). The main ink droplet reaches the printing medium and the mist spreads around by the flow of air generated as a carriage moves. The mist of the liquid A, which has spread in such manner, may be deposited on the surface of the ejection portion of liquid B.

Dirt on the ejection opening surface caused by the rebounding of the ink described above can be reduced by increasing a distance between the sheet and the ejection opening surface (hereafter referred to as a "distance to paper"). However, as the distance to paper increases, a flying distance of an ejected ink and time for flying increases and accuracy in depositing the ink on the sheet may be reduced, thereby degrading a printed image.

In addition, a configuration that wipes the ejection opening surface using a blade formed of an elastic member such as rubber is generally used as means for cleaning and removing the dirt once deposited on the ejection section opening surface. Such a configuration, however, has various problems. For example, it cannot totally remove the dirt. In particular, in the case that a processing liquid that makes the inks insoluble is used, it is likely to be mixed in the mist or the rebounded liquid. When the mixed liquid in deposited near the ink or processing-liquid ejection openings, it often becomes a highly viscous deposit and cannot be removed by a normal wiping means. Consequently, deflection or non ejection are often caused, and further, when the deposit becomes significant, the ink ejection may even be totally prevented from being ejected.

With respect to a general problem caused by the mist or the rebounded ink, the inventors of the present invention have found that such mist and rebounded ink are closely related to the printing duty. That is, in the example shown in FIGS. 1A and 1B, the inventors have found that the dirt on the ink ejection opening surface can be reduced by reducing the printing duty of the respective liquids A and B. It is thought be achieved by reducing an an amount of liquids simultaneously ejected from a plurality of ejection openings to reduce the mist, by reducing an ejection duty of the liquid A so that the liquid A is prevented from becoming like an ocean on the sheet to reduce the rebounding of ink by reducing a number of, the ejected droplets of the liquid B to reduce the rebounding of this liquid, and the like.

It should be noted that, to solve the above problem, the assignee of the present invention has proposed in Japanese Patent Application Laying-open No. 8-329648 a method for varying an amount of processing liquid to be applied depending on a number of printing passes. This method, however, has a mode in which the processing liquid is effective and a mode in which it is not effective. Especially, it is difficult that both the mode in which the processing liquid is sufficiently effective and a mode in which high speed printing is carried out are simultaneously achieved.

SUMMARY OF THE INVENTION

It is an object of the present invention to provide an ink-jet printing method and an ink-jet printing apparatus in which an ejection portion can be prevented from being made dirty by mist or rebounded liquids in order to improve reliability of the print head with only lowering a printing speed to minimum extent that is required.

It is another object of the present invention to provide an ink-jet printing apparatus and on ink-jet printing method in which when a printing duty per single head scanning operation of a head on a predetermined region on which an image is printed is greater than a predetermined value, the predetermined region is printed with a plurality of times of scanning operations to lower the printing duty per a single printing operation among the plurality of times of scanning operations, thereby reducing an ejection frequency of a liquid such as an ink to reduce a dirt on an ejection portion caused by mist or the like.

It is a yet another object of the present invention to provide an ink-jet printing apparatus and an ink-jet printing method that can improve printing quality without spoiling reliable ejections from an ink ejection portion and a printing-quality-improving-liquid ejection portion, the spoiling of the reliable ejections being due to solidification of a rebounded ink and a printing quality improving liquid from a sheet, on the ink ejection portion and the printing-quality-improving-liquid ejection portion.

In a first aspect of the present invention, there is provided an ink-jet printing apparatus for performing printing by ejecting an ink and a liquid which makes a coloring material in the ink insoluble or coagulate to a printing medium while scanning an ink ejection portion for ejecting the ink and a liquid ejection portion for ejecting the liquid relatively to the printing medium, the apparatus comprising:

judging means for judging whether or not printing for a predetermined area of the printing medium is performed with a plurality of times of scanning operations, depending upon information on a printing duty of the predetermined area; and printing control means of performing printing in accordance with judgment by the judging means.

In a second aspect of the present invention, there is provided an ink-jet printing apparatus for performing printing on a printing medium by using an ink ejection portion for ejecting an ink and a liquid ejection portion for ejecting a liquid which makes a coloring material in the ink insoluble or coagulate, comprising:

judging means for judging whether or not a value corresponding to a printing duty of a predetermined area of the printing medium is greater than a predetermined value; and printing control means for executing printing on the predetermined area with a plurality of times of printing operations when the judging means judges that the value corresponding to the printing duty is greater than the predetermined value.

In a third aspect of the present invention, there is provided an ink-jet printing apparatus for performing printing by ejecting an ink and a liquid which makes a coloring material in the ink insoluble or coagulate to a printing medium while scanning an ink ejection portion for ejecting the ink and a liquid ejection portion for ejecting the liquid relatively to the printing medium, the apparatus comprising:

receiving means for receiving print information; and printing control means for performing printing on a predetermined area of the printing medium based on information indicating whether or not printing for the predetermined area is performed with a plurality of scanning operations of the ink ejection portion and the liquid ejection portion depending upon information related to the printing duty of the predetermined area which information is obtained from the print information received by the receiving means.

In a fourth aspect of the present invention, there is provided an ink-jet printing apparatus for performing printing by applying an ink and a liquid which makes the ink insoluble or coagulate to a medium, comprising:

printing control means for performing printing on a predetermined area of the medium with a plurality of times of printing operation when a value related to a number of dots formed with the ink applied to the predetermined area is greater than a predetermined value.

In a fifth aspect of the present invention, there is provided a controlling method of an ink-jet printing apparatus for performing printing by applying an ink and a liquid which makes the ink insoluble or coagulate to a medium, comprising the steps of:

judging whether or not a value related to a number of dots formed with the ink applied to a predetermined area of the medium is greater than a predetermined value; and controlling the ink-jet printing apparatus so that printing on the predetermined area is performed with a plurality of times of printing operations when the value related to the number of dots is greater than the predetermined value.

In a sixth aspect of the present invention, there is provided an ink-jet printing apparatus for performing printing by applying an ink and a liquid while makes the ink insoluble or coagulate to a medium, comprising:

printing control means for performing printing on a predetermined area of the medium with a plurality of times of printing operations when a value related to gradation of an image formed on the predetermined area is greater than a predetermined value.

It should be noted that in this specification, terms "liquid that makes coloring materials in an ink insoluble or coagulate", "processing liquid", and "printing quality improving liquid" have same meanings.

The above and other objects, effects, features and advantages of the present invention will become apparent from the following description of embodiments thereof taken in conjunction with the accompanying drawings.

BRIEF DESCRIPTION OF THE DRAWINGS

FIGS. 1A and 1B are illustrations showing how a liquid ejection portion is made dirty due to a rebounding of inks or the like;

FIGS. 7A to 7C are explanatory illustrations showing another example of the dividing printing method according to the first embodiment;

DESCRIPTION OF THE PREFERRED EMBODIMENT

Embodiments of the present invention will be discussed below with reference to the drawings.
(Embodiment 1)

Figure 1A:
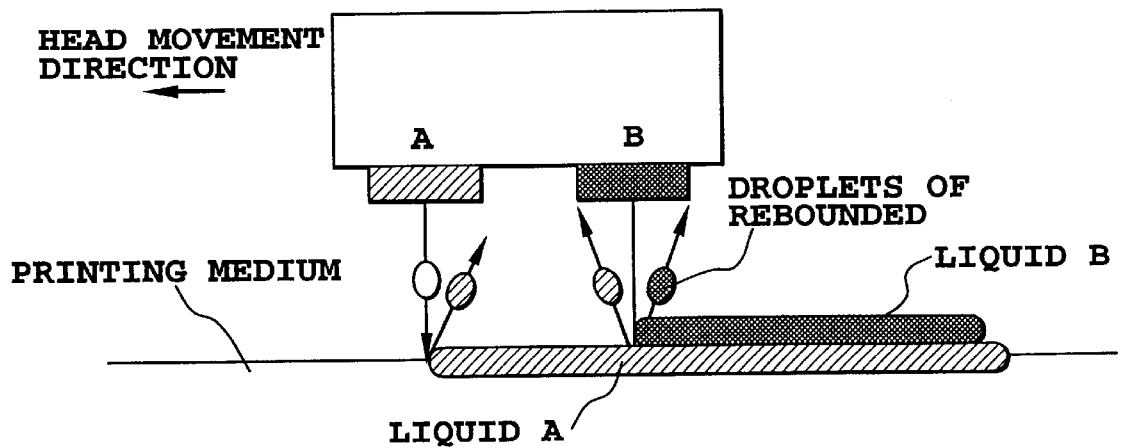
Figure 1B:
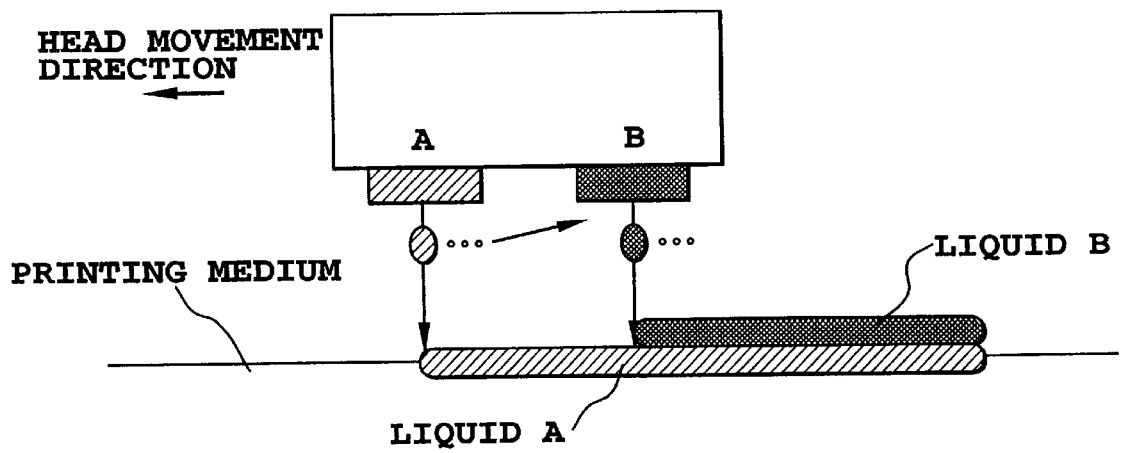
Figure 2:
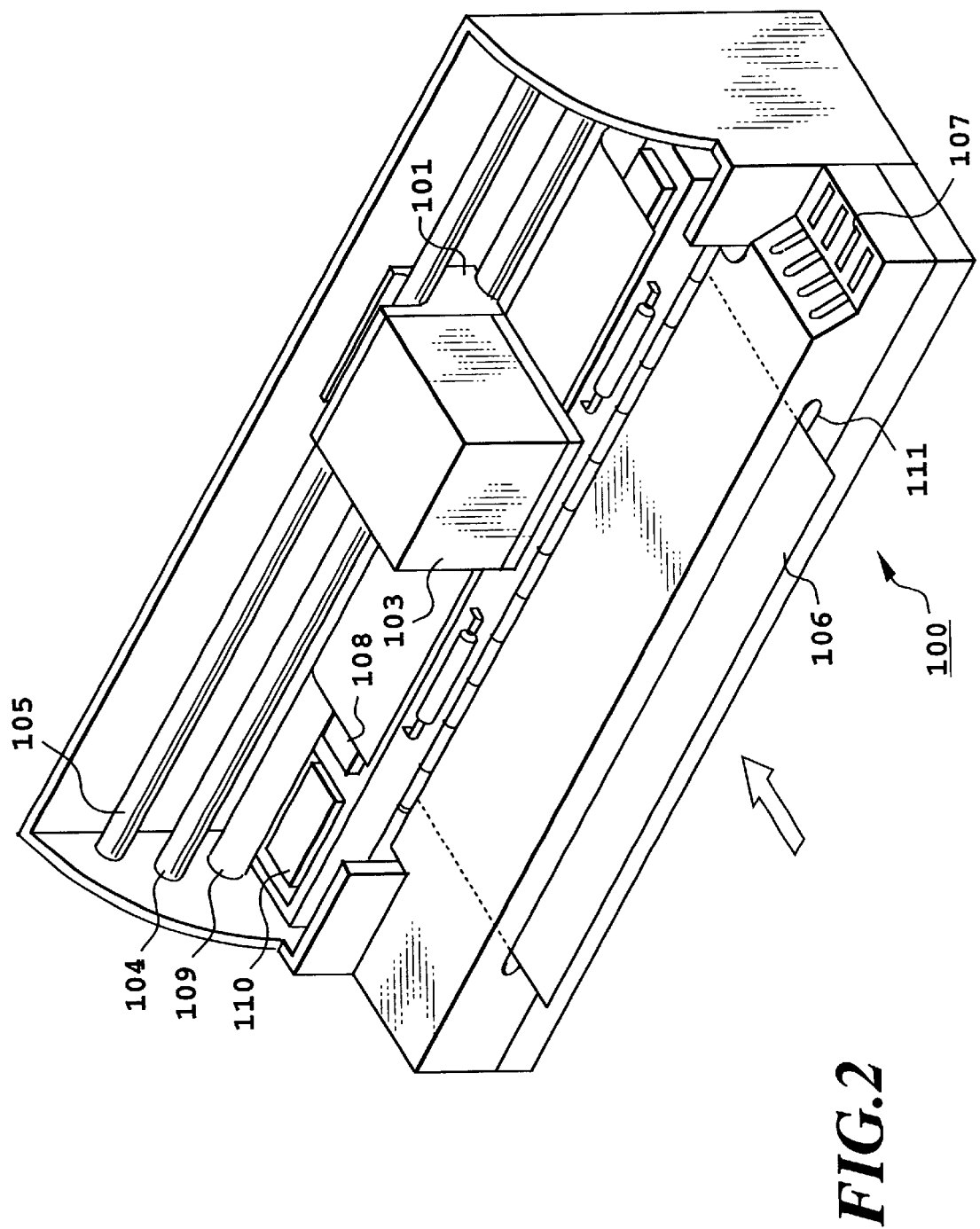
FIG. 2 is a perspective view showing an ink-jet printing apparatus according to one embodiment of the present invention.

FIG. 2 is a schematic perspective view showing an example of an ink-jet printing apparatus to which the present invention is applied.

A printing medium 106 is inserted into a feeding position in a printing apparatus 100, and then is transferred to a printing area, in which printing is to be performed by using a print head unit 103, by a means of feeding roller 109. A platen 108 is provided under the printing medium in the printing area. A carriage 101 is movably engaged with two guide shafts 104 and 105 and thereby can be moved in the printing area in a forward and a backward directions by means of drive means (not shown) while being guided by the guide shafts 104 and 105. The carriage 101 mounts a print head unit 103 including print heads that eject a plurality of colors of ink and a processing liquid (S), respectively and tanks that store the inks and the processing liquid which are supplied to the print heads, respectively. The plurality of colors of ink provided in the ink-jet printing apparatus of the shown embodiment include inks of black (Bk), cyan (C), magenta (M), and yellow (Y).

The processing liquid S of the shown embodiment is used not only to improve the water-resistance of printed images, as described above, but also to increase optical density or to prevent bleeding between colors of inks. Thus, this processing liquid is also called a "printing quality improving liquid" below. The printing quality improving liquid (the processing liquid) and inks are explained in brief.

Here, as an example, the processing liquid or solution for making ink dyestuff insoluble can be obtained in the following manner.

Specifically, after the following components are mixed together and dissolved, and the mixture is pressure-filtered by using a membrane filter of 0.22 μm in pore size (tradename: fuloropore filter manufactured by Sumitomo Electric Industries, Ltd.), and thereafter, pH of the mixture is adjusted to a level of 4.8 by adding sodium hydroxide whereby liquid A1 can be obtained.

| [components of A1] | |
|---|---|
| low molecular weight ingredients of cationic compound; stearyl-trimethyl ammonium salts (tradename: Electrostriper QE, manufactured by Kao Corporation), or stearyl-trimethyl ammonium chloride (tradename: Yutamine 86P, manufactured by Kao Corporation) | 2.0 parts by weight |
| high molecular weight ingredients of cationic compound; copolymer of diarylamine hydrochloride and sulfur dioxide (having an average molecular weight of 5000) (tradename: polyaminesulfon PAS-92, manufactured by Nitto Boseki Co., Ltd) | 3.0 parts by weight |
| thiodiglycol | 10 parts by weight |
| water | balance |

Preferable examples of ink which become insoluble by mixing the aforementioned processing liquid can be noted below.

Specifically, the following components are mixed together, the resultant mixture is pressure-filtered with the use of a membrane filter of 0.22 μm in pore size (tradename: Fuloroporefilter, manufactured by Sumitomo Electric Industries, Ltd.) so that yellow ink Y1, magenta ink M1, cyan ink C1 and black ink K1 can be obtained.

| [Yellow ink Y1] | |
|---|---|
| C. I. direct yellow 142 | 2 parts by weight |
| thiodiglycol | 10 parts by weight |
| acetynol EH (tradename manufactured by Kawaken Fine Chemical Co., Ltd.) | 0.05 parts by weight |
| water | balance |

[Magenta Ink M1]

having the same composition as that of Y1 other than that the dyestuff is changed to 2.5 parts by weight of C. I. acid red 289.

[Cyan Ink C1]
  having the same composition as that of Y1 other than that the dyestuff is changed to 2.5 parts by weight of acid blue 9.

[Black Ink K1]
  having the same composition as that of Y1 other than that the dyestuff is changed to 3 parts by weight of C. I. food black 2.

According to the present invention, the aforementioned processing liquid and ink are mixed with each other at the position on the printing medium or at the position where they penetrate in the printing medium. As a result, the ingredient having a low molecular weight or cationic oligomer among the cationic material contained in the processing liquid and the water soluble dye used in the ink having anionic radical are associated with each other by an ionic mutual function as a first stage of reaction whereby they are instantaneously separated from the solution liquid phase.

Next, since the associated material of the dyestuff and the cationic material having a low molecular weight or cationic oligomer are adsorbed by the ingredient having a high molecular weight contained in the processing liquid as a second stage of reaction, a size of the aggregated material of the dyestuff caused by the association is further increased, causing the aggregated material to hardly enter fibers of the printed material. As a result, only the liquid portion separated from the solid portion permeates into the printed paper, whereby both high print quality and a quick fixing property are obtained. At the same time, the aggregated material formed by the ingredient having a low molecular weight or the cationic oligomer of the cationic material and the anionic dye by way of the aforementioned mechanism, has increased viscosity. Thus, since the aggregated material does not move as the liquid medium moves, ink dots adjacent to each other are formed by inks each having a different color at the time of forming a full colored image but they are not mixed with each other. Consequently, a malfunction such as bleeding does not occur. Furthermore, since the aggregated material is substantially water-insoluble, water resistibility of a formed image is complete. In addition, light resistibility of the formed image can be improved by the shielding effect of polymer. It should be noted that "acetynol EH" is a tradename as stated above and a name of it as chemical substance is "ethylene oxide-2,4,7,9-tetraethyl-5-decyne-4,7-diol".

By the way, the term "insoluble" or "aggregation" refers to observable events in only the above first stage or in both the first and second stages.

When the present invention is carried out, since there is no need of using the cationic material having a high molecular weight and polyvalent metallic salts like the prior art or even though there is need of using them, it is sufficient that they are assistantly used to improve an effect of the present invention, a quantity of usage of them can be minimized. As a result, the fact that there is no reduction of a property of color exhibition that is a problem in the case that an effect of water resistibility is asked for by using the conventional cationic high molecular weight material and the polyvalent metallic salts can be noted as another effect of the present invention.

With respect to a printing medium usable for carrying out the present invention, there is no specific restriction, so called plain paper such as copying paper, bond paper or the like conventionally used can preferably be used.

In FIG. 2, a recovery unit 110 is provided at a left end of an area in which the carriage can be moved and is positioned under the print head unit when the unit is moved to be located at the end of the area. This arrangement enables an ejection opening portion of the print head to be closed with a cap while printing is not performed out and enables a suction recovery operation to be executed. The position at the left end is called a "home position" of the print head hereinafter.

A reference numeral 107 denotes an operation portion in which operation switches and a display element are arranged. The operation switches are used to turn on and off the power supply to the printing apparatus and to set various printing modes, and the display element displays conditions of the printing apparatus.

Figure 3A:
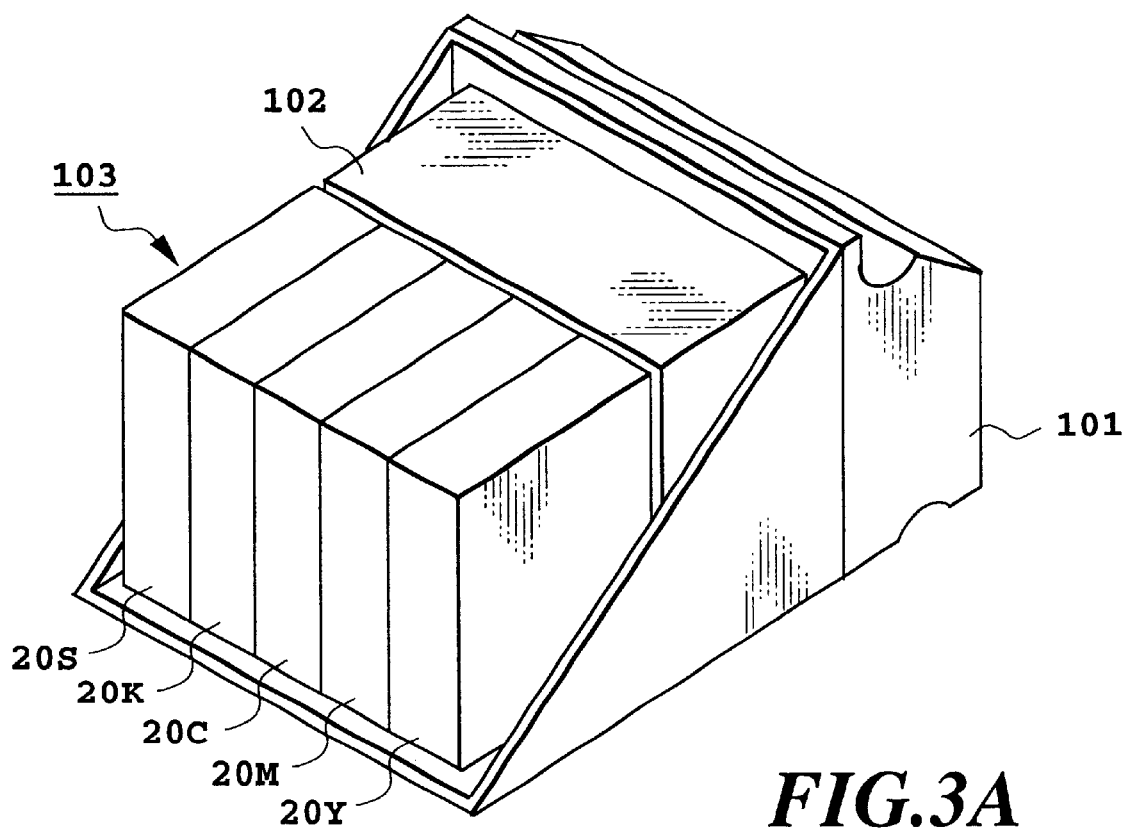
FIGS. 3A and 3B are a perspective view and a conceptual illustrations showing a print head unit used in the ink-jet printing apparatus.

FIG. 3A is a perspective view showing the print head unit 103. This example shows a structure in which tanks for color inks of black, cyan, magenta, and yellow as well as the printing quality improving liquid can all be independently replaced.

The carriage 101 mounts a unit 102 in which respective print heads which eject the inks of Bk, C, M, and Y and the printing quality improving liquid S are housed, respectively; a tank 20k for a Bk ink; a C tank 20C for a C ink; a tank 20M for a M ink; a tank 20Y for a Y ink; and a tank 20S for the printing quality improving liquid (s). Each tank is connected to the corresponding print head via its connection portion to supply the ink or the printing quality improving liquid to ejection openings of each print head.

Figure 3B:
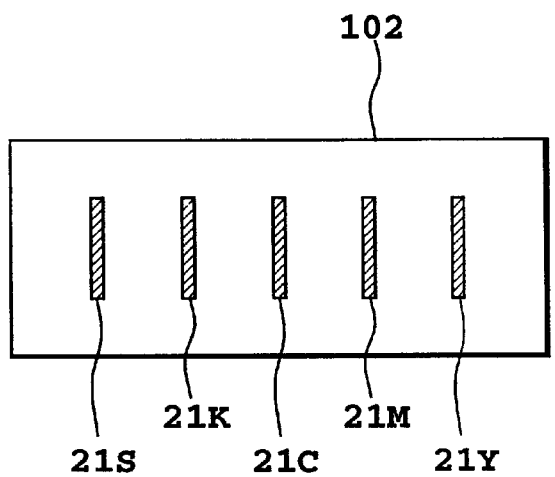

FIG. 3B is a schematic view showing a structure of an ink ejection portion of the unit 102 in which the print heads are housed, as seen from a printing sheet. Each print head are provided with a plurality of ejection openings and thereby, the unit 102 has a Bk ink ejection portion 21K for ejecting the Bk ink, a C ink ejection portion 21C for ejecting the C ink, an M ink ejection portion 21M for ejecting the M ink, a Y ink ejection portion 21Y for ejecting the Y ink, and a printing-quality-improving-liquid ejection portion 21S for ejecting the printing quality improving liquid.

It should be noted that the print head of the shown embodiment has an electrical-thermal conversion element for generating thermal energy and uses this energy to generate bubbles in the ink or the processing liquid so as to eject the ink or the processing liquid.

Furthermore, the arrangement of the print heads and ink tanks are not limited to an above example, but the color tanks may be integrated together or the tank and print head may be integrated together for each ink. In addition, the shown embodiment may have an arrangement corresponding to a larger number of ink colors.

Figure 4:
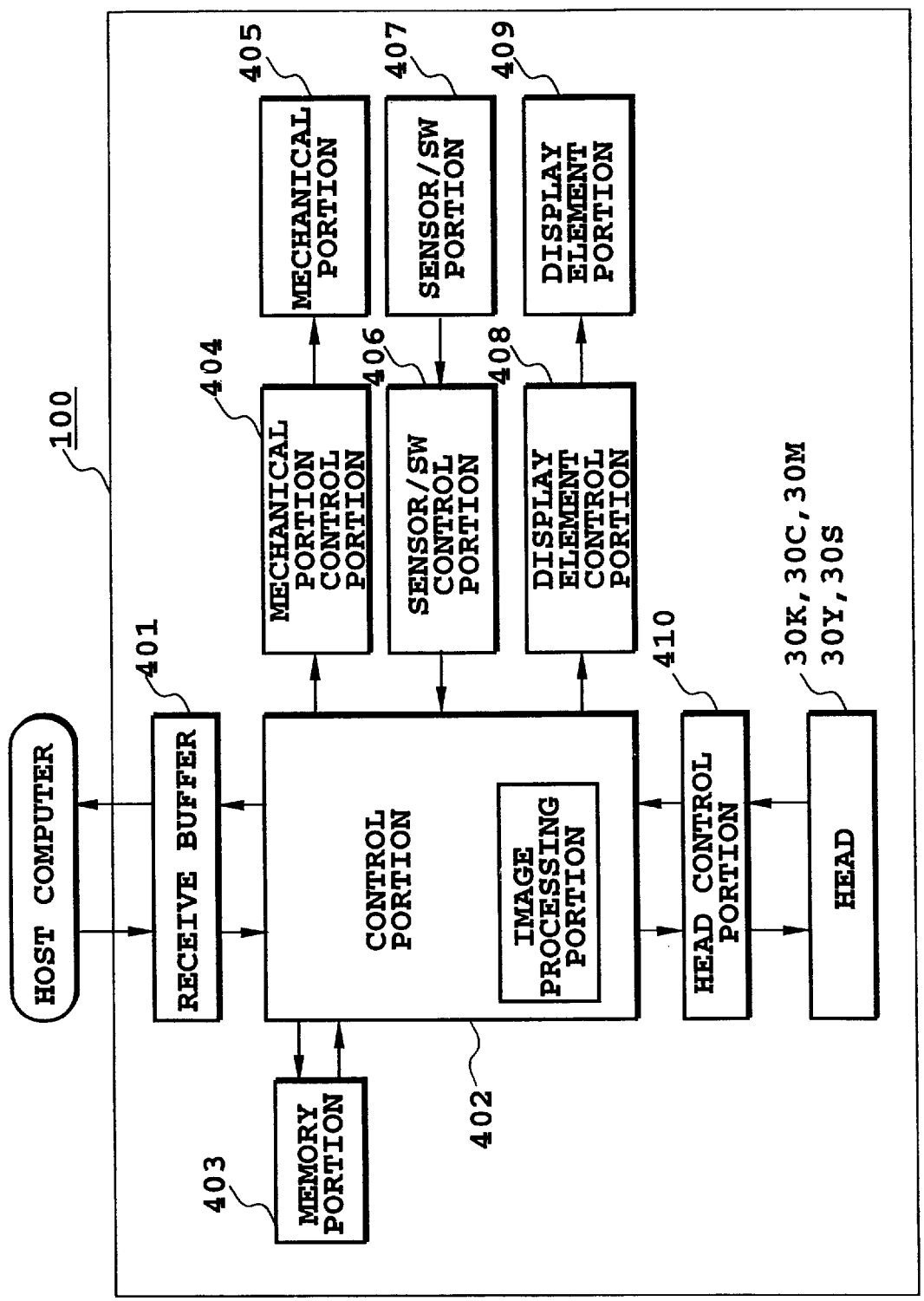
FIG. 4 is a block diagram showing a controlling structure of the ink-jet printing apparatus.

FIG. 4 is a block diagram showing a controlling structure of the ink-jet printing apparatus described above. Character and image data transferred from a host computer is contemporarily held in a receiving buffer 401 in the printing apparatus. On the other hand, the printing apparatus transfers to the host computer data for confirming whether or not data is being correctly transferred to the apparatus or indicating the operating condition of the printing apparatus. The data held in the receiving buffer 401 is transferred to a memory portion 403 under control by a control portion 402 having a CPU and the like, and then the data is temporarily stored in a RAM (a random access memory).

A mechanical portion control portion 404 controls driving of a mechanical portion 405 including a carriage motor, a line feed motor and the like, based on a command from the control portion 402. A sensor/SW control portion 406 transfers signals to the CPU 402 from a sensor/SW portion 407 consisting of various sensors and switches (SW). A display element control portion 408 controls a display executed by a display element portion 409 consisting of LEDs, liquid crystal display elements and the like, in the operation portion based on commands from the control portion 402. A head control portion 410 controls driving of the print heads 30K, 30C, 30M, 30Y, and 30S based on commands from the control portion 402. The head control portion also transmits temperature information indicating a condition of each print head to the control portion 402. It should be noted that although control for a processing or an operation in each embodiment discussed in FIG. 5 and the subsequent figures is provided by the control structure shown in FIG. 4 discussed above, this invention is not limited to such an arrangement. The processing or the operation shown in each embodiment may be carried out by the host apparatus so that the ink-jet printing apparatus operates in response to a processing by the best apparatus. In this case, a receiving portion for receiving control data based on the processing by the host apparatus is provided in the ink-jet printing apparatus.

Figure 5:
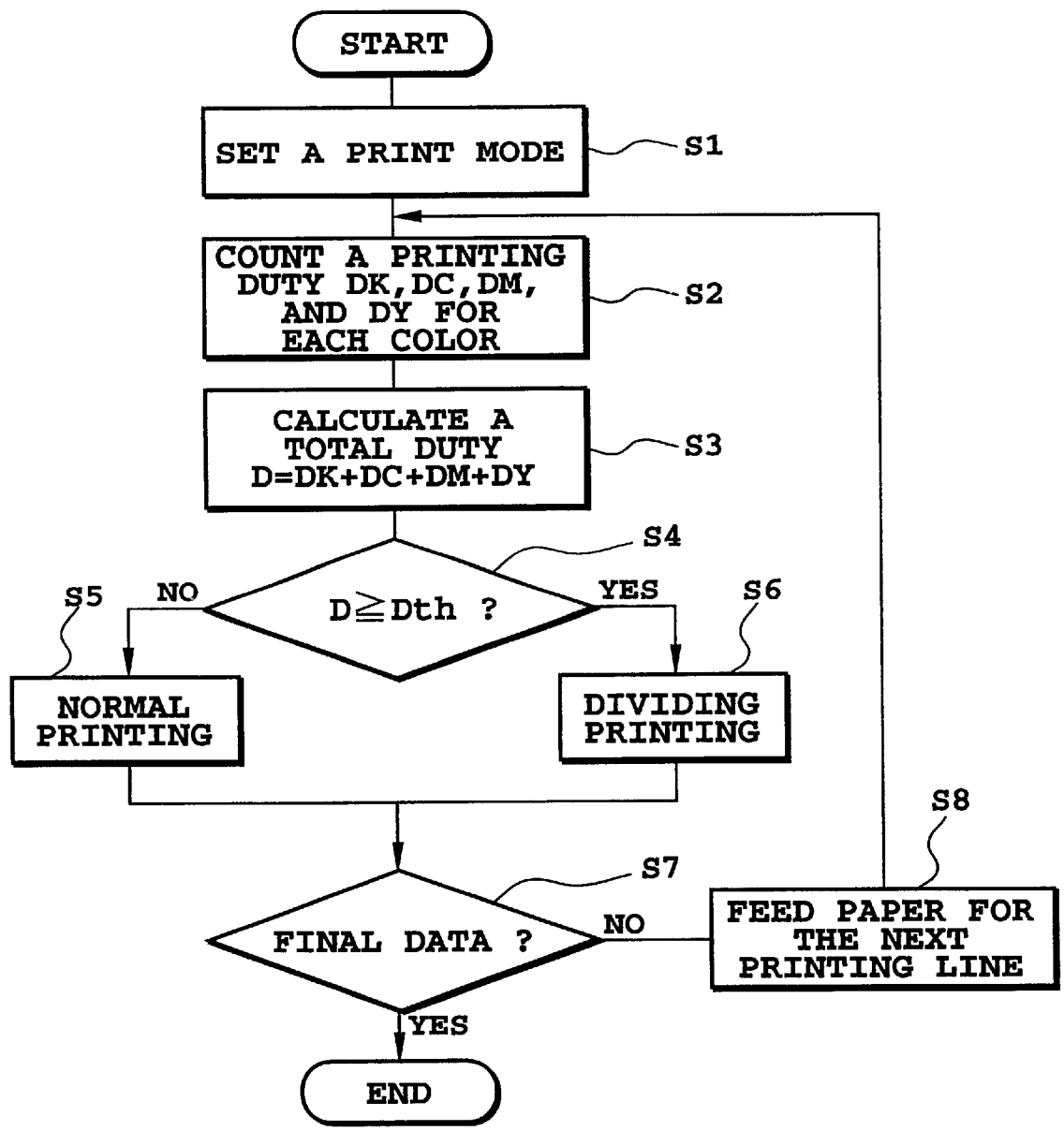
FIG. 5 is a flowchart showing a printing operation according to a first embodiment of the present invention.

FIG. 5 is a flowchart showing a procedure of a printing operation performed in the shown embodiment by the structure described above.

First, at step S1, a normal print mode is set. Then, at step S2, the printing duty DK, DC, DM, and DY during a next single scanning operation that is to be performed is counted for all the color inks of Y, M, C, and K. A term referred as the "printing duty" means a ratio of a number of actual ejections for each color during the single scanning operation to a maximum number of ejections which can be executed for each color during the single scanning operation. For example, in an arrangement in which a single dot is formed by a single ejection, the printing duty corresponds to the ratio of the number of actually formed dots to the number of pixels that can be printed during the single scanning operation.

At step S3, a total printing duty D corresponding to a sum of the printing duties of respective colors of inks is calculated base on the duties counted. Next, at step S4, it is determined whether or not the total duty is greater than or equal to a predetermined threshold Dth. If the total printing duty D is blow the threshold value Dth, the shown processing proceeds to step S6 to perform printing operation in a normal mode (hereinafter, also refereed as a "second mode") set at step S1. That is, in this mode, the apparatus executes printing during a single scanning operation. On the other hand, in the case that the total duty D is greater than or equal to the threshold value Dth, the shown processing advances to step S6 to carry out dividing printing of a first mode as discussed after. The processing dicussed above is subsequently repeated to execute printing until data to be printed has been finished (steps S7 and S8). It should be noted that, in the second mode, printing on predetermined area of a printing medium can be performed with less number of times of scanning operation than that in the first mode, and therefore, high speed printing can be achieved in the second mode. However, the number of times of scanning operation carried out in the second mode for printing the predetermined area is not limited to one time.

Figure 6A:
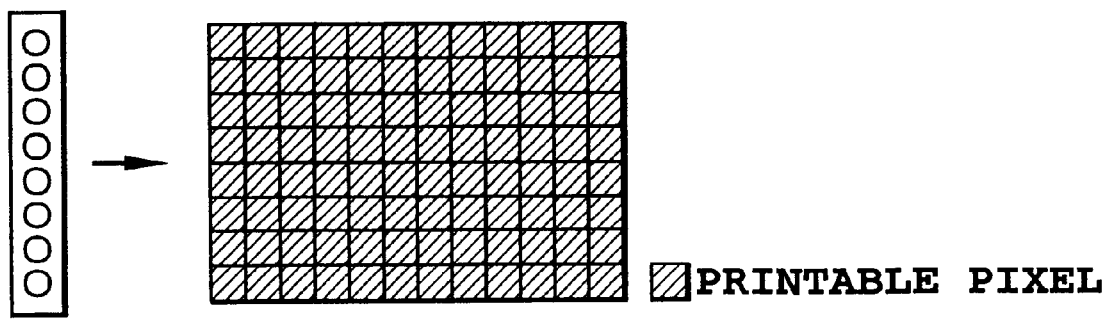
FIGS. 6A to 6C are explanatory illustrations showing an example of a dividing printing method in the printing operation according to the first embodiment.
Figure 6B:
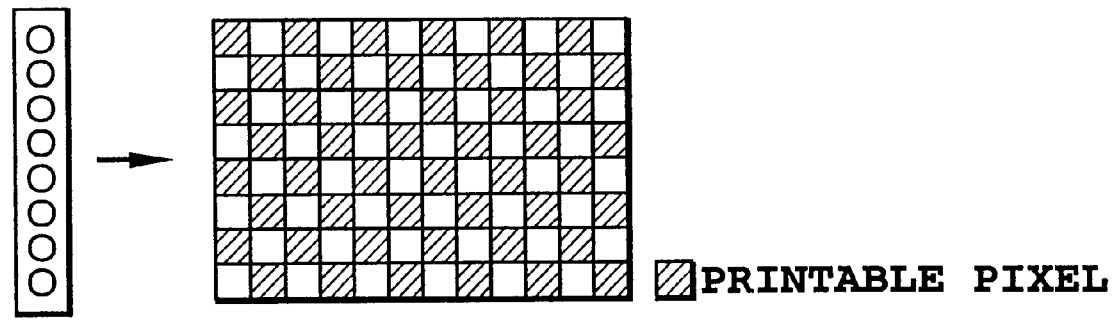
Figure 6C:
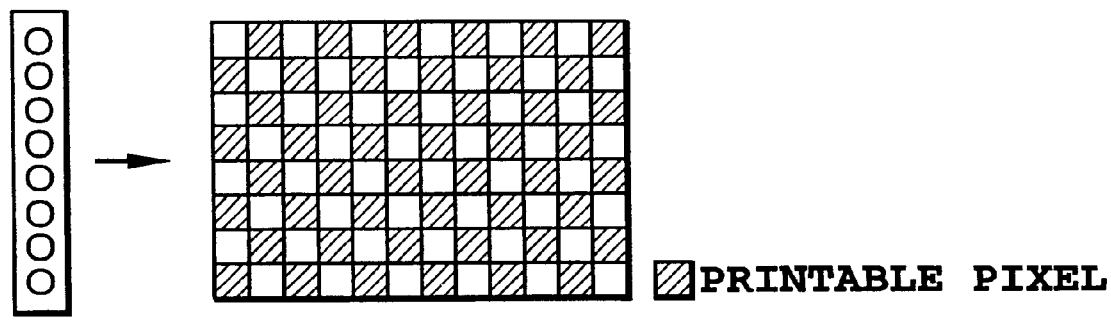

FIGS. 6A to 6C are illustrations explaining an example of a dividing printing method carried out at step S6. There will be discussed a case when each head has eight ejection openings and an image consisting of longitudinal 8×lateral 12 pixels on each of which one dot can be formed is printed, for simplification of discussion.

FIG. 6A shows an example of printing in the normal printing mode. In this case, all pixels can be printed during a single scanning operation. When the ejection data for each pixel is "1", ejection is carried out to form dot. In each forming of dot, both the ink and the printing quality improving liquid are ejected. Instead of ejecting the printing quality improving liquid in such a way as to correspond to each ejection of the ink, ejections of the printing quality improving liquid may be thinned at a predetermined rate. In this case, each dot is formed with only the ink or both the ink and the printing quality improving liquid. Even in this case, desired effects such as the prevention of ink bleeding can be obtained by the printing quality improving liquid.

FIGS. 6B and 6C are illustrations showing an example of a printing method in the dividing printing mode. In this example, printing of one line image is executed during two scanning operations and all pixels of one line image are made correspondent with either two scanning operations so that half of all pixels can be printed during either two scanning operation. When the dividing printing mode is activated based on the determination at step 4 stated above, each of hatched pixels in a conquered pattern shown in FIG. 6B is enabled to be printed. Under this condition, when the ejection data for these pixels is "1", the relevant ink and printing quality improving liquid are ejected to form the dots. In a second scanning operation, the pixels that complement the pixels which are enabled to be printed in a first scanning operation is enabled to be printed, and then the dots are similarly formed, as shown in FIG. 6C. Also in this case, each dot may be formed of only ink or both the ink and the printing quality improving liquid, as discussed for the normal printing mode.

By executing the dividing printing as shown in FIGS. 6B and 6C, the printing duty per single scanning operation can be reduced to half compared to a core that the normal printing mode is executed even when the total printing duty is greater or equal to the threshold value Dth. As discussed above, the dirt on the ejection portion that may degrade the reliability of the print head can be reduced by reducing the printing duty. As a result, the reliability of the printing apparatus can be improved.

It should be noted that the embodiment shown in FIGS. 6B and 6C has been discussed in conjunction with the use of a specified 50%-thinned pattern to complete an image during two scanning operations. However, the thinning method and the number of scanning operations for the dividing printing are not limited to this aspect and can be determined depending on a dirty condition on the ejection portion. For example, the pattern may be the one shown in FIG. 7A in which pixel rows in the scanning direction complement each other or the one shown in FIG. 7B in which the image is completed during three scanning operations. Alternatively, the thinning rate may vary among the scanning operations, as shown in FIG. 7C. Any of these patterns may be used as long as it can reduce the dirt on the neighborhood of the ejection openings caused by the mist or the rebounded liquid and the image can be completed without losing any dots, in accordance with characteristics of the ink, head, and printing medium used.

In addition, according to the shown embodiment, the total duty is calculated at step S3 by determining the simple sum of the duties of respective colors DK, DC, DM, and DY. However, the present invention is not limited to this aspect. The total duty may be the sum of duties weighted depending on the physical properties of the inks and the location of the ejection portion. When, for example, the black ink is more likely to be subjected to the mist or the rebounded liquid than the other inks, the printing duty DK of the black can be multiplied by a constant value to increase its contribution to the total duty D.

The inks according to this embodiment each contain an anionic dye, and the printing quality improving liquid contains a cationic substance.

Ink usable for carrying out the present invention should not be limited only to dyestuff ink, and pigment ink having pigment dispersed therein can also be used. Any type of processing liquid can be used, provided that pigment is aggregated with it. The following pigment ink can be noted as an example of pigment ink adapted to cause aggregation by mixing with the treatment liquid Al previously discussed. As mentioned below, yellow ink Y2, magenta ink M2, cyan ink C2 and black ink K2 each containing pigment and anionic compound can be obtained.

[Black Ink K2]

The following materials are poured in a batch type vertical sand mill (manufactured by Aimex Co.), glass beads each having a diameter of 1 mm is filled as media using anion based high molecular weight material P-1 (aqueous solution containing a solid ingredient of styrene methacrylic acid ethylacrylate of 20% having an acid value of 400 and average molecular weight of 6000, neutralizing agent: potassium hydroxide) as dispersing agent to conduct dispersion treatment for three hours while water-cooling the sand mill. After completion of dispersion, the resultant mixture has a viscosity of 9 cps and pH of 10.0. The dispersing liquid is poured in a centrifugal separator to remove coarse particles, and a carbon black dispersing element having a weight-average grain size of 10 nm is produced.

| (composition of carbon black dispersing element) | |
|---|---|
| P-1 aqueous solution (solid ingredient of 20%) | 40 parts by weight |
| carbon black Mogul L (tradename: manufactured by Cablack Co.) | 24 parts by weight |
| glycerin | 15 parts by weight |
| ethylene glycol monobutyl ether | 0.5 parts by weight |
| isopropyl alcohol | 3 parts by weight |
| water | 135 parts by weight |

Next, the thus obtained dispersing element is sufficiently dispersed in water, and black ink K2 containing pigment for ink jet printing is obtained. The final product has a solid ingredient of about 10%.

[Yellow Ink Y2]

Anionic high molecular P-2 (aqueous solution containing a solid ingredient of 20% of stylen-acrlylic acid methyl methaacrylate having an acid value of 280 and an average molecular weight of 11,000, neutralizing agent: diethanolamine) is used as a dispersing agent and dispersive treatment is conducted in the same manner as production of the black ink K2 whereby yellow color dispersing element having a weight-average grain size of 103 nm is produced.

| (composition of yellow dispersing element) | |
|---|---|
| P-2 aqueous solution (having a solid ingredient of 20%) | 35 parts by weight |
| C. I. pigment yellow 180 (tradename: Nobapalm yellow PH-G, manufactured by Hoechst Aktiengesellschaft) | 24 parts by weight |
| triethylen glycol | 10 parts by weight |
| diethylenglycol | 10 parts by weight |

| (composition of yellow dispersing element) -continued | |
|---|---|
| ethylene glycol monobutylether | 1.0 parts by weight |
| isopropyl alcohol | 0.5 parts by weight |
| water | 135 parts by weight |

The thus obtained yellow dispersing element is sufficiently dispersed in water to obtain yellow ink Y2 for ink jet printing and having pigment contained therein. The final product of ink contains a solid ingredient of about 10%.

[Cyan Ink C2]

Cyan colored-dispersant element having a weight-average grain size of 120 nm is produced by using the anionic high molecular P-1 used when producing the black ink K2 as dispersing agent, and moreover, using the following materials by conducting dispersing treatment in the same manner as the carbon black dispersing element.

| (composition of cyan colored-dispersing element) | |
|---|---|
| P-1 aqueous solution (having solid ingredient of 20%) | 3.0 parts |
| C. I. pigment blue 153 (tradename: Fastogen blue FGF, manufactured by Dainippon Ink And Chemicals, Inc.) | 24 parts by weight |
| glycerin | 15 parts by weight |
| diethylenglycol monobutylether | 0.5 parts by weight |
| isopropyl alcohol | 3 parts by weight |
| water | 135 parts by weight |

The thus obtained cyan colored dispersing element is sufficiently stirred to obtain cyan ink C2 for ink jet printing and having pigment contained therein. The final product of ink has a solid ingredient of about 9.6%.

[Magenta ink M2]

Magenta color dispersing element having a weight-average grain size of 115 nm is produced by using the anionic high molecular P-1 used when producing the black ink K2 as dispersing agent, and moreover, using the following materials in the same manner as that in the case of the carbon black dispersing agent.

| (composition of the magenta colored dispersing element) | |
|---|---|
| P-1 aqueous solution (having a solid ingredient of 20%) | 20 parts by weight |
| C. I. pigment red 122 (manufactured by Dainippon Ink And Chemicals, Inc.) | 24 parts by weight |
| glycerin | 15 parts by weight |
| isopropyl alcohol | 3 parts by weight |
| water | 135 parts by weight |

Magenta ink M2 for ink jet printing and having pigment contained therein is obtained by sufficiently dispersing the magenta colored dispersing element in water. The final product of ink has a solid ingredient of about 9.2%.

(Embodiment 2)

Embodiment 1 discussed above shows the method in which the number of all dots printed during a single scanning operation is counted to determine whether the mode is for normal or dividing printing.

However, despite the same number of dots formed in one line image related to scanning, some images evenly arrange the dots all over one line image and other images locally concentrate the dots at a high printing duty. The method of Embodiment 1 cannot distinguish these two types of images from each other. This is explained using the example shown in FIGS. 8A and 8B.

Figure 8A:
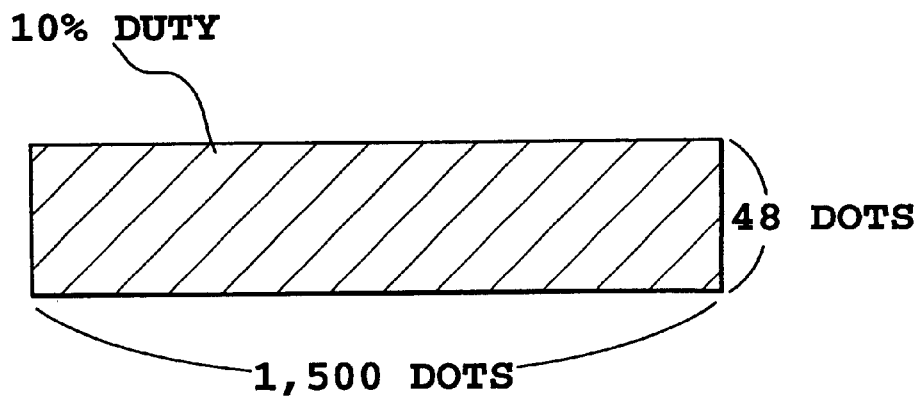
FIGS. 8A and 8B are illustrations explaining localization of a printing duty in a second embodiment of the present invention.
Figure 8B:
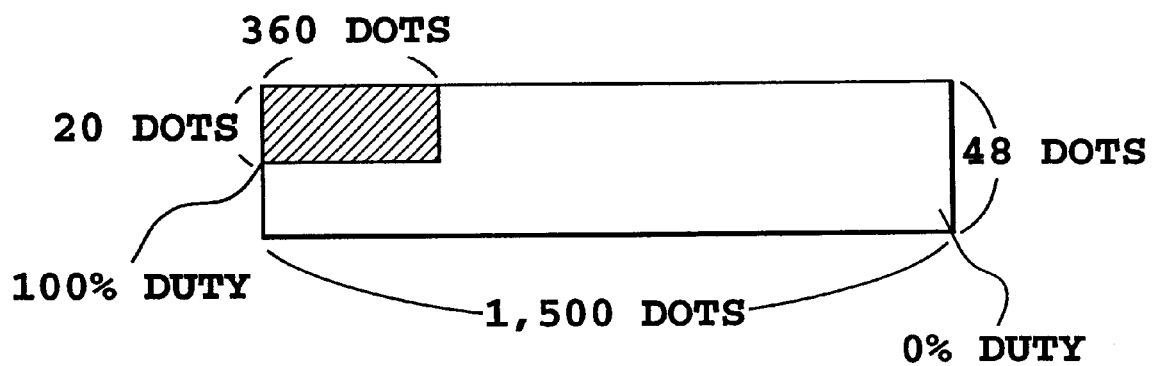

FIGS. 8A and 8B show the case in which dots are arranged in an area in which 48×1,500 dots can be printed during a single scanning operation. In FIG. 8A, a case that the dots are evenly arranged in the 48×1,500-dot area at a printing duty of 10% and the total number of printed dots is 7,200 is shown. On the other hand, in FIG. 8B, a case that the 7,200 print dots are arranged in the 48×1,500-dot area in such a way that the total printing duty becomes 10% similarly to an example of FIG. 8A but the dots are locally printed is shown. More specifically, the 20×360-dot area in the upper left of the 48×1,500-dot area has the printing duty of 100%, whereas no dots are arranged in the other areas. As in these examples, despite the same printing duty, in the case that the dots are evenly arranged at a generally low printing duty, the local printing duty is low so that there are few needs to carry out the dividing printing. On the contrary, in the case that the dots are locally printed at the high printing duty as in FIG. 8B, the mist and the rebounded liquid are likely to occur when that area is printed, it is much possible to cause the neighborhood of the ejection openings to be made dirty. Consequently, the divided printing is desirable for this case.

Thus, the shown embodiment detects the local distribution of dots to more accurately determine whether or not the dividing printing is required, in order to prevent throughput from decreasing due to unwanted execution of the dividing printing.

Figure 9:
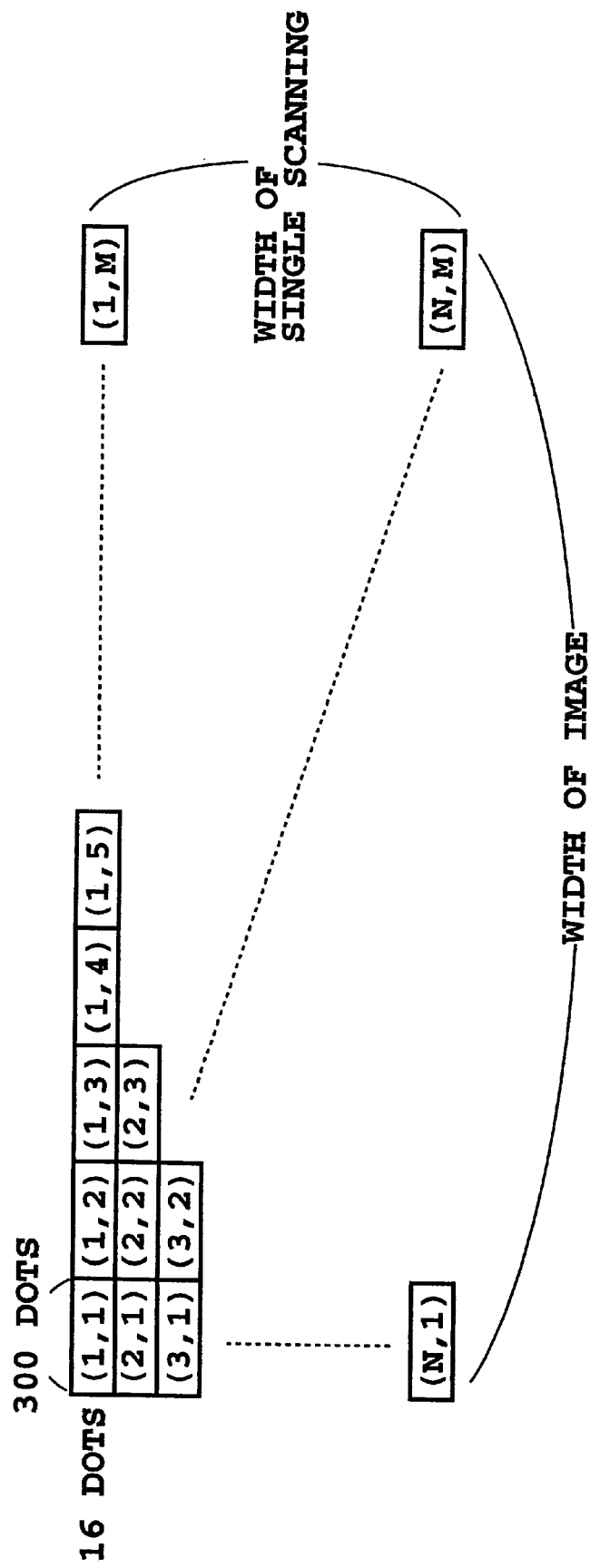
FIG. 9 is an explanatory illustration showing an example of the printing duty count unit area according to the second embodiment.

FIG. 9 shows an example of a count area defined such that one line image area related to scanning is divided into a plurality of count areas in each of which the printing duty is counted. A single count unit area has longitudinal 16×lateral 300 dots and count unit areas are distinguished from each other by numbering the count unit areas. The printing duty is counted for each count unit area, and when a number of count unit areas that have a printing duty exceeding a threshold value is greater than or equal to a predetermined number, that one line image is subjected to the dividing printing. On the other hand, when the printing duty is less than the threshold value in all count unit areas, that one line image is printed in the normal mode.

The printing method will be discussed with reference to FIGS. 10A and 10B.

Figure 10A:
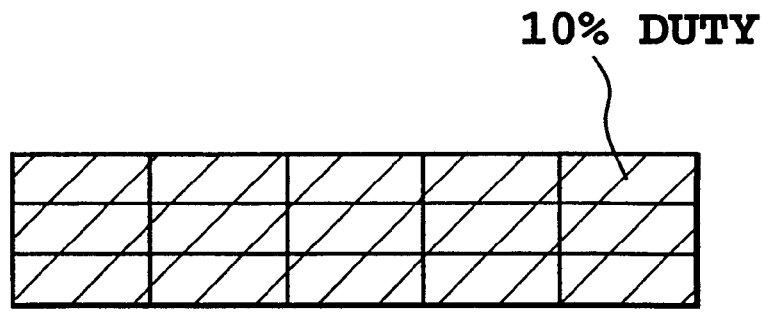
FIGS. 10A and 10B are illustrations explaining a relationship between the unit area and the printing duty in the second embodiment.

In FIG. 10A, the dots are arranged in such a way to have a printing duty of 10% all over one line image area, as in FIG. 8A. Thus, the total number of printed dots is 7,200 dots, and the number of dots printed in each count unit region is the same as 480 dots.

Figure 10B:
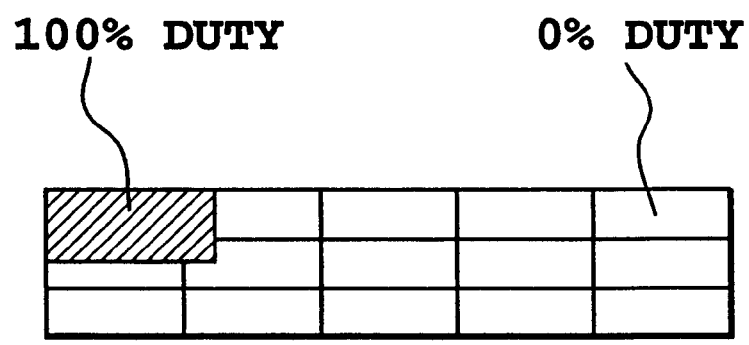

On the contrary, in FIG. 10B, the dots are printed in a 20×360-dot area at the printing duty of 100%, whereas no dots are printed in the other portions (0% duty) as in FIG. 8B. Thus, the total number of dots printed in one line image area is 7,200 as in FIG. 10A, but when the one line image area is divided into the count unit areas as shown in FIG. 9, 4,800 dots are counted in the count unit area (1, 1), 960 dots are counted in the count unit area (1, 2); 1,200 dots are counted in the count unit area (2, 1); 240 dots are counted in the count unit area (2, 2); and no dot is counted in the other count areas.

The threshold value used to determine whether or not the dividing printing for each count unit area is assumed to be 1,500 dots, and the dividing printing is assumed to be executed when counted value at least one count unit area exceeds the threshold value. In case of FIG. 10A, all unit areas have the printing duty lower than the threshold value. Therefore, the normal printing mode is executed instead of the dividing printing. Conversely, in the case of FIG. 10B, counted value at one unit area exceeds the threshold value, therefore, the dividing printing is carried out. That is, the printing is performed with a plurality of scanning operations.

It should be noted that the method shown in Embodiment 1 or any of the other methods discussed above may be used for the dividing printing.

In addition, the smaller the size of the count unit area used to count the printing duty, the better counting of the printing duty can be coped with the locality of the printing duty. However, more calculations are required, thereby reducing the processing speed. Thus, the unit region must be optimally set to avoid decrease in printing speed, depending upon characteristics of the inks, print head, and printing medium. In addition, the threshold value is not limited to the above example but can be set at an optimal value.

(Embodiment 3)

In Embodiment 2, only one type of count unit area and the threshold for counting the printing duty are set. However, they may be set for each ink color used.

In the head arrangement shown in FIG. 3, since the head that ejects the black ink is disposed adjacent to the head that ejects the printing quality improving liquid, the ink ejection portion of the black ink is likely to be made dirty by the mist of the printing quality improving liquid. Thus, when the printing duty for the black ink is relatively high, much dirt is deposited on the ejection portion to degrade reliability of the head. Since, however, the other color heads are disposed relatively distantly from the head ejecting the printing quality improving liquid, the dirt caused by the printing quality improving liquid is unlikely to occur despite continuous high-duty printing, and therefore, reliability is prevented from being significantly degraded.

In such a head arrangement, the reliability of the color ink ejection portion is unlikely to be degraded compared to the black ink ejection portion. Thus, for the color ink ejection portion the threshold value of counted dots for selection of the dividing printing is set at a higher value than that for the black ink ejection portion. In addition, the inventor of the present invention found that rebounding of the ink or the printing quality improving liquid is affected by surface tension of the ink or the printing quality improving liquid. More specifically, a phenomenon of rebounding of the ink includes separation of the ink on a sheet or a part of the ink ejected to the sheet from the sheet or the ink on the sheet, and the separation is caused by ejecting the ink to the ink already ejected. When the surface tension of the ink is high, great inward force acts in the ink owing to the high surface tension of the ink, and therefore, the ink is hard to be separated. On the other hand, the ink of low surface tension has the small inward force. Then, the ink is likely to be separated. Consequently, for the color of the ink which is likely to rebound, that is, for the color of the ink having low surface tension, or for the color of the ink which is ejected in precedent and is of low surface tension, the threshold value for selecting whether or not the dividing printing is executed is set to be relatively small so as to be effective for improving the reliability of the print head.

Figure 11:
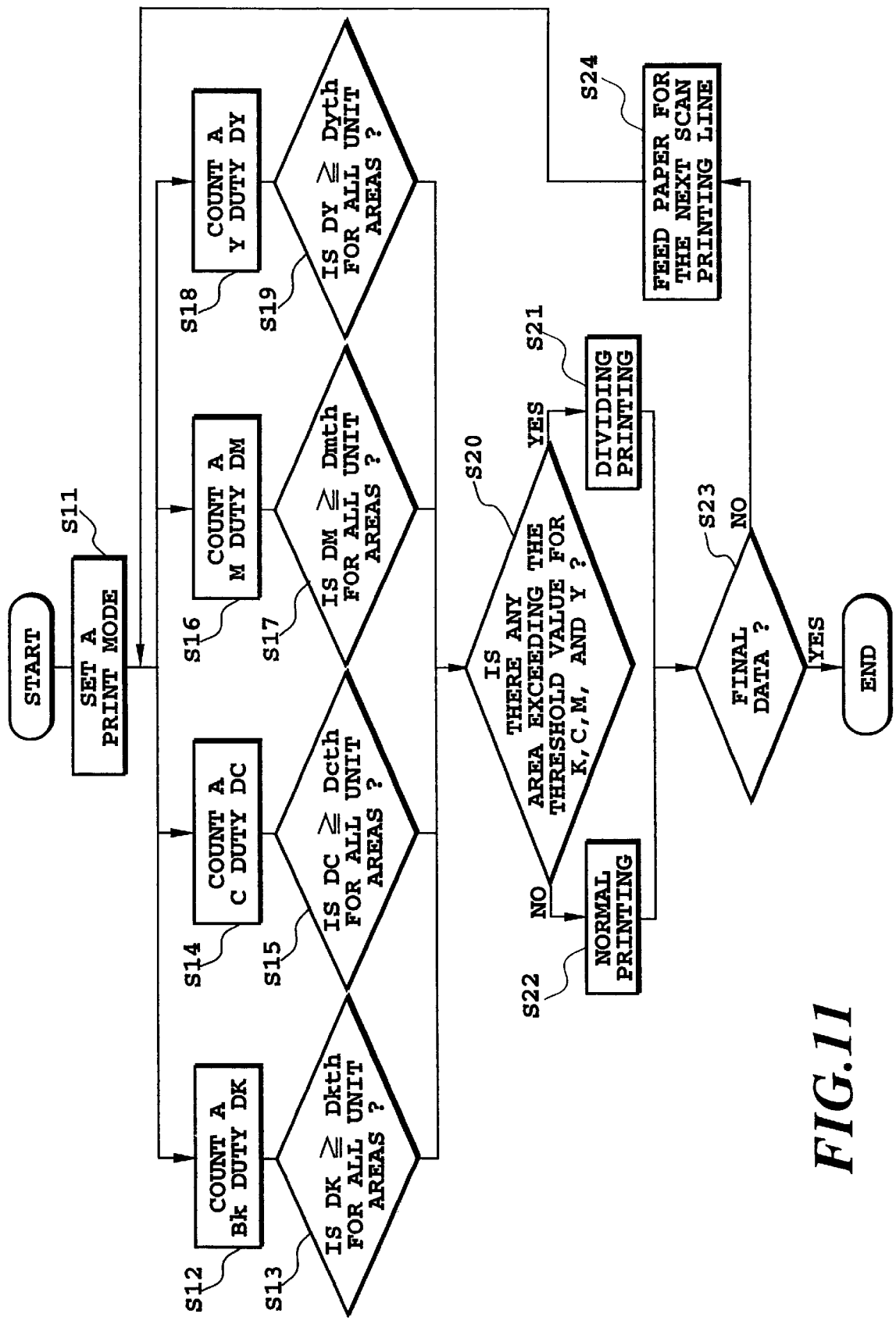
FIG. 11 is a flowchart showing a printing operation according to a third embodiment of this invention.

FIG. 11 is an explanatory view showing a flow of processing according to this embodiment.

When, for example, the count unit area is assumed to have longitudinal 16×lateral 300 dots as in Embodiment 2, the threshold for each ink and the liquid are set as follows depending on the distance between each head and the printing-quality-improving-liquid head.

Black (Dkth) 1,500 dots
C (Dcth) 2,000 dots
M (Dmth) 2,500 dots
Y (Dyth) 3,000 dots First, at step S11, the printing mode is set. Then, at step S12, for the printing duty of the black ink, a printing area related to scanning is divided into duty count unit areas and counts a number of dots Dk for each count unit area. At determination step S13, it is determined whether or not the Dk of each unit area is smaller than Dkth for black dots. Likewise, for cyan (C), magenta (M), and yellow (Y), at steps S14, S16, and S18, the printing duty of each count unit area during a single scanning operation is counted, and at determination steps S15, S17, and S19, it is determined whether or not the numbers of dots DC, DM, and DY printed in each unit area are smaller than the respective threshold values Dcth, Dmth, and Dyth for the respective colors.

Next, at printing mode determination step S20, it is determined whether or not the dividing printing is to be carried out. In the case that for all colors and for all count unit area, the number of dots is smaller than the threshold value, the process passes to step S22 to execute printing in accordance with the printing mode set at step S11. On the other hand, in the case that in any color, the number of dots of at least one unit area exceeds the threshold value, the process passes to step S21 to carry out the dividing printing in a predetermined manner. This printing operation is repeated until the data is finished.

By setting threshold values depending on the arrangement of the head as in this embodiment, the undesired execution of the dividing printing mode is avoided to prevent unnecessary decrease in printing speed caused by the dividing printing.

Of course, the threshold value for each ink is not limited to this embodiment. Further, the present invention may be effectively applied also to an aspect that the threshold value is set taking property such as the surface tension or the like into account. In the shown embodiment, the count unit area for each color has the same size. However, it may be effective that different-sized unit area may be set for different colors depending on the configuration of the print head and characteristics of the inks.

(Embodiment 4)

Embodiment 1 shows an example of dividing printing for a single scanning operation. However, the dividing printing may be applied to any mode other than the mode of the single scanning operation. For example, a multi-pass printing mode in which different ejection openings correspond to the same region so that printing is achieved with a plurality of scanning operations forms an image by assigning a reduced number of dots to each of the plurality of scanning operations. Thus, this mode reduces the printing duty for each scanning operation compared to the mode of the single scanning operation that prints all print data during a single scanning operation. Consequently, in this multi-pass mode, the neighborhood of the ejection opening is unlikely to be made dirty by the mist or the rebounded liquid. When, however, the multi-pass printing involves an emphasis printing mode that must print a large number of dots during a single scanning operation or the neighborhood of the ejection openings is likely to be mode dirty due to characteristics of the inks or print head, it may be effective that printing by each scanning operation among the multi-pass scanning operations can be divided as in the mode of the single scanning operation in the above embodiments. In this case, the count area for counting the duty and threshold values may be the same as or different from those in the mode of the single scanning operation.

(Embodiment 5)

In the Embodiment 1–4 discussed above, judgement whether the dividing printing is to be executed or not is made based on a number of dots printed on the printing medium or information about the duty, that is, based on information about multi-level data which is obtained by that a driver performs multi-level conversion of an image data into the multi-level data.

The shown embodiment shows that the judgement is made based on data which is not yet an object of the multi-level conversion, that is, based on color image data.

A color image is generally expressed by 8 bit data for each of R(red), G(green) and B(blue), that is, by 256 tone level data. An image data expressed by a combination of respective values for R, G, B is converted to information of on/off for each pixel and for each color of ink dot used in a printing apparatus by performing color processing and quantization (multi-level conversion) in accordance with respective predetermined methods. Then, the printing apparatus performs based on thus converted data.

Once the respective methods for color processing and quantization are determined, a correspondent relation between the combination of respective values for R, G, B and the duties of respective color inks expressing a color represented by the combination is generally established in accordance with the methods.

For instance, the color represented by the combination of R=0, G=0, B=0 is the darkest black and printing of this color is performed at duty of substantially 100%. In such printing of black at high duty, since a relatively great amount of the mist and the rebounded liquid may be generated to lower reliability of the printing head as discussed above, it is preferable to perform the dividing printing. In contrast, the color respresented by the combination of R=250, G=250, B=250 is a light color near white. When printing of such light color is performed, few ink dots are printed. Therefore, it is not necessary to perform the dividing printing.

Apparently from the above discussion, the judgement whether the dividing printing is to be executed can be made based on the combination of values R, G, B at an unit area for the judgement in the original color image data represented by the values of R, G, B. In this case, a threshold value used for judgement depends upon parameters used for the color processing and the quantization, and for instance, is determined as R<120, B<120 and G<120.

It should be noted that, when performing the dividing printing, the printing apparatus may receive printing data from a host computer and may execute dividing process in a predetermined method to generate printing data for the printing data, or alternatively, the host computer may generate thinned printing data which is obtained by preliminarily thinning printing data and then transfers the thinned data to the printing apparatus.

As described above, according to the embodiment of the present invention, when the printing duty of a predetermined area to be printed while the head is scanned once is higher than the specified value, that area can be divided into multiple areas of pixel, and each of areas is separately printed, thereby reducing the printing duty of each of the plurality of printing operations for the areas to reduce the dirt on the ejection portion caused by the mist on the like.

As a result, this structure can provide a reliable printing apparatus that is unlikely to provide inappropriate ejection. Furthermore, only high-duty portions can be printed using a plurality of scans while low-duty portions can be printed in the normal printing mode. Therefore, the unwanted decrease in printing speed can be avoided.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet printing apparatus for performing printing by ejecting an ink and a liquid which makes a coloring material in the ink insoluble or coagulate to a printing medium while scanning an ink ejection portion for ejecting the ink and a liquid ejection portion for ejecting the liquid relatively to the printing medium, said apparatus comprising:

judging means for judging whether or not printing for a predetermined area of the printing medium is performed with a plurality of scanning operations, depending upon information on a printing duty of the predetermined area; and printing control means of performing printing in accordance with judgment by said judging means, wherein said predetermined area is divided into a plurality of unit areas and said judging means judges whether or not printing for said predetermined area is performed with a plurality of scanning operations, depending upon information on a printing duty of each of the unit areas.

2. An ink-jet printing apparatus as claimed in claim 1, wherein the printing duty is defined as a ratio of an actual number of ejection during one scanning operation to a maximum number of ejection during one scanning operation.

3. An ink-jet printing apparatus as claimed in claim 1, further comprising duty counting means for calculating the printing duty of the predetermined area based on print data.

4. An ink-jet printing apparatus as claimed in claim 1, further comprising scanning means for scanning the ink ejection portion and the liquid ejection portion, and the predetermined area of the printing medium is an area scanned by said ink ejection portion and said liquid ejection portion for one time.

5. An ink-jet printing apparatus as claimed in claim 1, wherein the ink ejection portion and the liquid ejection portion include a thermal energy generator for ejecting the ink and the liquid, respectively.

6. An ink-jet printing apparatus for performing printing on a printing medium by using an ink ejection portion for ejecting an ink and a liquid ejection portion for ejecting a liquid which makes a coloring material in the ink insoluble or coagulate, comprising:

judging means for judging whether or not a value corresponding to a printing duty of a predetermined area of the printing medium is greater than a predetermined value; and printing control means for executing printing on said predetermined area with a plurality of printing operations when said judging means judges that the value corresponding to the printing duty is greater than said predetermined value, wherein the ejected the inks are comprised of a plurality of kinds of ink each of which has different color, the predetermined value used for judging by said judging means is specified for each of said plurality of kinds of ink, and each of the predetermined values is specified depending on distances between the respective ink ejection portions for the plurality of kinds of ink and the liquid ejection portion.

7. An ink-jet printing apparatus as claimed in claim 6, wherein the printing duty is defined as a ratio of an actual number of ejection during one scanning operation to a maximum number of ejection during one scanning operation.

8. An ink-jet printing apparatus as claimed in claim 6, further comprising duty counting means for calculating the printing duty of the predetermined area based on print data.

9. An ink-jet printing apparatus as claimed in claim 6, further comprising scanning means for scanning the ink ejection portion and the liquid ejection portion, and wherein the predetermined area of the printing medium is an area scanned by said ink ejection portion and said liquid ejection portion for one time.

10. An ink-jet printing apparatus as claimed in claim 6, wherein each of the predetermined values specified for each of the plurality of kinds of ink is specified depending on a property of said ink.

11. An ink-jet printing apparatus as claimed in claim 10, wherein the property of the ink is surface tension of said ink.

12. An ink-jet printing apparatus as claimed in claim 6, wherein the ink ejection portion and the liquid ejection portion include a thermal energy generator for ejecting the ink and the liquid, respectively.

13. An ink-jet printing apparatus for performing printing on a printing medium by using an ink ejection portion for ejecting an ink and a liquid ejection portion for ejecting a liquid which makes a coloring material in the ink insoluble or coagulate, comprising:

judging means for judging whether or not a value corresponding to a printing duty of a predetermined area of the printing medium is greater than a predetermined value; and printing control means for executing printing on said predetermined area with a plurality of printing operations when said judging means judges that the value corresponding to the printing duty is greater than said predetermined value, wherein said predetermined area is divided into a plurality of unit areas used for calculating a value corresponding to the printing duty and said printing control means executes printing on said predetermined area with a plurality of printing operations when said judging means judges that the printing duty is greater than said predetermined value in a predetermined number of the unit areas by comparing the printing duty with said predetermined value for each unit area.

14. An ink-jet printing apparatus as claimed in claim 13, wherein said unit area is specified for each of a plurality of kinds of ink.

15. An ink-jet printing apparatus for performing printing by ejecting an ink and a liquid which makes a coloring material in the ink insoluble or coagulate to a printing medium while scanning an ink ejection portion for ejecting the ink and a liquid ejection portion for ejecting the liquid relatively to the printing medium, said apparatus comprising:

receiving means for receiving print information; and printing control means for performing printing on a predetermined area of the printing medium based on information indicating whether or not printing for said predetermined area is performed with a plurality of scanning operations of the ink ejection portion and the liquid ejection portion, said information being related to the printing duty of said predetermined area and being obtained from the print information received by said receiving means, wherein said predetermined area is divided into a plurality of unit areas and said information is information on a printing duty of each of the unit areas.

16. An ink-jet printing apparatus for performing printing by applying an ink and an liquid which makes the ink insoluble or coagulate to a medium, comprising:

ink and liquid driving means for performing printing on a predetermined area of the medium with a plurality of printing operations when a value related to a number of dots formed with the ink applied to said predetermined area is greater than a predetermined value, wherein the applied inks are comprised of a plurality of inks, the predetermined value is specified for each of said plurality of inks, and each of the predetermined values is specified depending on distances between the respective ink ejection portions for applying the plurality of inks and a liquid ejection portion for applying the liquid.

17. An ink-jet printing apparatus as claimed in claim 16, wherein said printing control means performs printing of a first mode in which said predetermined area is printed with the plurality of printing operations when the value related to the number of dots is greater than said predetermined value, and performs printing of a second mode in which said predetermined area is printed with less number of times of printing operation than that in the first mode when the value related to the number of dots is not more than said predetermined value.

18. A controlling method of an ink-jet printing apparatus for performing printing by applying an ink and a liquid which makes the ink insoluble or coagulate to a medium, comprising the steps of:

judging whether or not a value related to a number of dots formed with the ink applied to a predetermined area of the medium is greater than a predetermined value; and controlling said ink-jet printing apparatus so that printing on said predetermined area is performed with a plurality of printing operations when the value related to the number of dots is greater than said predetermined value, wherein the applied inks are comprised of a plurality of inks, said predetermined value is specified for each of said plurality of inks, and each of the predetermined values is specified depending on distances between the respective ink ejection portions for applying the plurality of inks and a liquid ejection portion for applying the liquid.

19. An ink-jet printing apparatus for performing printing by applying an ink and a liquid while makes the ink insoluble or coagulate to a medium, comprising:

ink and liquid driving means for performing printing on a predetermined area of the medium with a plurality of printing operations when a value related to gradation of an image formed on said predetermined area is greater than a predetermined value, wherein the applied inks are comprised of a plurality of inks, said predetermined value is specified for each of said plurality of inks, and each of the predetermined values is specified depending on distances between the respective ink ejection portions for applying the plurality of inks and a liquid ejection portion for applying the liquid.

20. An ink-jet printing apparatus for performing printing on a printing medium by using an ink ejection portion for ejecting an ink and a liquid ejection portion for ejecting a liquid which makes a coloring material in the ink insoluble or coagulate, comprising:

ink and liquid driving means for executing printing on a predetermined area with a plurality of printing operations when a value corresponding to a printing duty of said predetermined area of the printing medium is greater than a predetermined value, wherein the ejected inks are comprised of a plurality of kinds of ink each of which has different color, the predetermined value is specified for each of said plurality of kinds of ink, and each of the predetermined values is specified depending on distances between the respective ink ejection portions for ejecting the plurality of kinds of ink and the liquid ejection portion.

21. A method of an ink-jet printing apparatus for performing printing by ejecting an ink and a liquid which makes a coloring material in the ink insoluble or coagulate to a printing medium while scanning an ink ejection portion for ejecting the ink and a liquid ejection portion for ejecting the liquid relatively to the printing medium, comprising the steps of:

judging whether printing for a predetermined area of the printing medium is performed with a plurality of scanning operations, depending upon information on a printing duty of the predetermined area; and controlling said ink-jet printing apparatus so that printing is performed in accordance with the judgment from said judging step, wherein said predetermined area is divided into a plurality of unit areas and said judging step determines whether printing for said predetermined area is performed with a plurality of scanning operations, depending upon information on a printing duty, of each of the unit areas.

22. A method of an ink-jet printing apparatus for performing printing on a printing medium by using an ink ejection portion for ejecting an ink and a liquid ejection portion for ejecting a liquid which makes a coloring material in the ink insoluble or coagulate, comprising the steps of:

judging whether a value corresponding to a printing duty of a predetermined area of the printing medium is greater than a predetermined value; and controlling said ink-jet apparatus so that printing is executed on said predetermined area with a plurality of printing operations when said judging step judges that the value corresponding to the printing duty is greater than said predetermined value, wherein the ejected inks are comprised of a plurality of kinds of ink, each of which has a different color, the predetermined value used for judging by said judging step is specified for each of said plurality of kinds of ink, and each of the predetermined values is specified depending on distances between the respective ink ejection portions for the plurality of kinds of ink and the liquid ejection portion.

23. A method of an ink-jet printing apparatus for performing printing by ejecting an ink and a liquid which makes a coloring material in the ink insoluble or coagulate to a printing medium while scanning an ink ejection portion for ejecting the ink and a liquid ejection portion for ejecting the liquid relatively to the printing medium, comprising the steps of:

receiving print information; and controlling said ink-jet apparatus so that printing is performed on a predetermined area of the printing medium based on information indicating whether printing for said predetermined area is performed with a plurality of scanning operations of the ink ejection portion and the liquid ejection portion, said information being related to the printing duty of said predetermined area and being obtained from the print information received during the receiving step, wherein said predetermined area is divided into a plurality of unit areas and said information is information on a printing duty of each of the unit areas.

24. A method of an ink-jet printing apparatus for performing printing by applying an ink and an liquid which makes the ink insoluble or coagulate to a medium, comprising the steps of:

performing printing, by using an ink and liquid driving means, on a predetermined area of the medium with a plurality of printing operations when a value related to a number of dots formed with the ink applied to said predetermined area is greater than a predetermined value, wherein the applied inks are comprised of a plurality of inks, the predetermined value is specified for each of said plurality of inks, and each of the predetermined values is specified depending on distances between the respective ink ejection portions for applying the plurality of inks and a liquid ejection portion for applying the liquid.

25. A method of an ink ink-jet printing apparatus for performing printing by applying an ink and a liquid which makes the ink insoluble or coagulate to a medium, comprising the steps of:

performing printing, by using an ink and liquid driving means, on a predetermined area of the medium with a plurality of printing operations when a value related to gradation of an image formed on said predetermined area is greater than a predetermined value, wherein the applied inks are comprised of a plurality of inks, said predetermined value is specified for each of said plurality of inks, and each of the predetermined values is specified depending on distances between the respective ink ejection portions for applying the plurality of inks and a liquid ejection portion for applying the liquid.

* * * * *

UNITED STATES PATENT AND TRADEMARK OFFICE
CERTIFICATE OF CORRECTION

PATENT NO. : 6,371,608 B1
DATED : April 16, 2002
INVENTOR(S) : Minako Kato et al.

It is certified that error appears in the above-identified patent and that said Letters Patent is hereby corrected as shown below:

Title page,
Item [56], References Cited, FOREIGN PATENT DOCUMENTS,
"58128862 should read -- 58-128862
 07195823          7-195823
 08052867"         8-052867 --.
Item [57], ABSTRACT,
Line 5, "a" should read -- an --.

Column 1,
Line 24, "machines" should read -- machines and --.

Column 2,
Line 50, "such" should read -- such a --.

Column 3,
Line 17, "thought" should read -- thought to --; and "an an" should read -- an --;
Line 43, "on" should read -- an --.

Column 4,
Line 66, "while" should read -- which --.

Column 8,
Lines 28 and 42, "are" should read -- is --.

Column 9,
Line 24, "referred" should read -- referred to --;
Line 36, "base" should read -- based --;
Line 39, "blow" should read -- below --;
Line 40, "S6" should read -- S5 --; and
Line 41, "refereed" should read -- referred to --.

Column 10,
Lines 13 and 14, "either" should read -- either of --;
Line 15, "operation" should read -- operations --;
Line 16, "step 4" should read -- step S4 --; and
Line 43, "dirty" should read -- dirt --.

Column 11,
Line 7, "A1" should read -- A1 --.

UNITED STATES PATENT AND TRADEMARK OFFICE
CERTIFICATE OF CORRECTION

PATENT NO.    : 6,371,608 B1
DATED         : April 16, 2002
INVENTOR(S)   : Minako Kato et al.

It is certified that error appears in the above-identified patent and that said Letters Patent is hereby corrected as shown below:

Column 14,
Line 7, "value" should read -- value of --.

Column 15,
Line 7, "are" should read -- is --.

Column 16,
Line 50, "an" should read -- a --.

Column 17,
Line 1, "pixel," should read -- pixels, --;
Line 4, "on" should read -- or --; and
Line 41, "ejection" should read -- ejections --.

Column 18,
Lines 13 and 14, "ejection" should read -- ejections --.

Column 19,
Line 14, "an" should read -- a --.

Column 20,
Line 17, "has" should read -- has a --.

Column 21,
Line 18, "an" should read -- a --.

Signed and Sealed this

Twelfth Day of November, 2002

Attest:

JAMES E. ROGAN
Attesting Officer
Director of the United States Patent and Trademark Office